Aug. 20, 1929.  LE ROY TRONC  1,725,229
CURLING IRON
Filed March 7, 1924
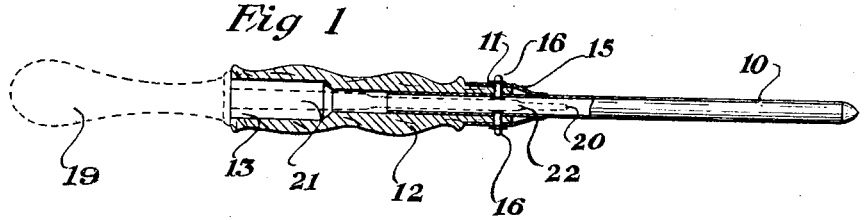
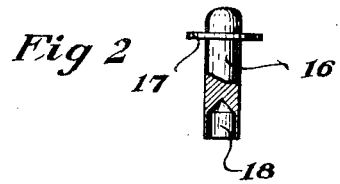
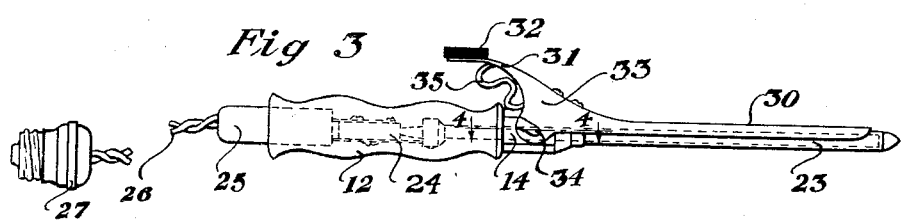
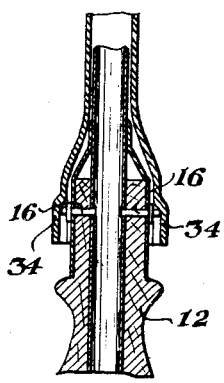
Inventor:
Le Roy Tronc.
By Wallace Att'y.

Patented Aug. 20, 1929.

1,725,229

UNITED STATES PATENT OFFICE.

LE ROY TRONC, OF CHICAGO, ILLINOIS, ASSIGNOR TO MAGGIE MAY SLAUGHTER, OF CHICAGO, ILLINOIS.

CURLING IRON.

Application filed March 7, 1924. Serial No. 697,512.

The present invention relates to curling irons and their manufacture, and has particularly to do with the joinder of the various elements comprising the completed article.

Primarily, the object of the invention is to simplify and improve the connection between the shield and the heating tube, and between the heating tube, ferrule and handle; and secondarily, it is an object of the invention to provide an unique take-a-part construction between the heating tube and shield. Additionally, it is an object of the invention to establish means for riveting the hollow heating tube, the handle, and the handle ferrule one to another without interferring with the insertion and removal of the heating element and its associated parts into and from said heating tube.

These and such other objects as may hereinafter appear are attained by the novel construction, combination and arrangement of the several parts of the device, hereinafter to be fully described, and completely illustrated in the accompanying single sheet of drawing, hereby made a part of this specification.

In said drawing:—

Figure 1 is a longitudinal section through the heating tube and handle; the riveting tool being in dotted lines;

Figure 2 is a detail, partly in section, of one of the connecting rivets intermediate said handle and heating tube;

Figure 3 is an elevation of the assembled iron; and

Figure 4 is a longitudinal section along the line 4—4 of Figure 3.

Like reference characters are used to designate similar parts in the drawing and in the description which follows:

Reference should be had to Figure 1. A hollow tube 10, of the conventional type, is provided with oppositely disposed apertures 11 adjacent its open end, such apertures 11 being of sufficient size to admit a rivet to be hereinafter described. A handle 12, of wood or composition and hollowed out at its center 13, in the usual fashion is fitted over the open end of tube 10, hereinafter called the heating tube. The opposite sides 14 of said handle 12 are flattened at their inner end for purposes to be soon apparent. Over the flattened sides 14 of said handle 12 a flat sided ferrule 15 is drawn, said ferrule 15 and the flattened sides 14 being apertured to register with apertures 11 in tube 10 and to receive a rivet 16 having a flange or shoulder 17 intermediate its length, but nearer its outermost extremity.

The details of construction of said rivet 16 are made clear in Figure 2. The inner end of said rivet 16 is hollow at 18 as indicated in said figure.

To join handle 12, heating tube 10, and ferrule 15, these parts are assembled so that the apertures in the handle and ferrule register with themselves, and with the apertures 11 in heating tube 10. The assembled parts are placed in a vise (not shown) and a rivet 16 is dropped into position in the apertures, flange 17 uppermost. A riveting tool, comprising a handle 19 and a body portion having two integrally formed cone shaped portions 20 and 21 rather sharply divided by the coniform shoulder 22 is inserted through the hollow part 13 of handle 12. The innermost portion 20 of the riveting tool is brought under rivet 16 and said rivet tapped with a hammer (not shown). The hollow portion 18 of said rivet spreads, and the tapping is continued as the riveting tool is further inserted into heating tube 10, until the larger portion 22 is brought to bear under rivet 16. In practice, two or three taps of the riveting hammer usually suffice to provide a complete spread of the hollow end 18 of rivet 16, and to provide a secure jointure between handle 12 heating tube 10 and ferrule 15.

The other side may be riveted by a similar operation. In practice, however, a rivet is inserted on one side, the tube 10 reversed, a rivet inserted upon the other side, and tapping is had while the lowermost rivet rests upon an anvil within the vise (not shown). A fast connection intermediate the heating tube 10, the handle 12 and ferrule 15 unaffected by subsequent shrinkage in the handle 12 is thus obtained with unobstructed access to heating tube 10 through handle 12.

The fixed or heating portion of the iron is further assembled by the insertion of heating element 23 into tube 10, the assembly of the electrical connections 24 secured thereto in handle 12, and by closing said handle with the plug 25 which plug includes the cord 26 and light attachment plug 27. Any conventional form for such parts may be employed.

A movable member comprising a longitudinal shield or jaw 30 semicircular in cross section closely engaging the exterior of heating tube 10, an extension portion 31 terminating in the conventional heat resisting button 32, an intermediate guard portion 33 provided with grooves 34 and pivoted to the rivets 16, and a spring member 35 secured to said movable member, completes the device.

The intermediate portion or guard 33 has stamped therein oppositely situated grooves 34 (see Figures 3 and 4) opening toward the handle 12 and disposed at such an angle that when the jaw or shield 30 is open to almost its greatest extent, said grooves 34 become parallel to heating tube 10. It is when in this position that the movable part is joined to the assembled heating portion of the device, the movable portion being forced toward the handle 12 when the open ends of grooves 34 register with the outermost ends of rivets 16. A spring 35 secured to the guard 33 adjacent shield 30 impinges ferrule 15 to urge the jaw or shield 30 closed, and in so doing conjointly urges the movable member toward handle 12, the limit of such inward movement being determined by the closed ends of grooves 34. Such spring action is continuous while the device is assembled. To disconnect the movable member from the heating or fixed member, the jaw 30 is opened until grooves 34 become parallel to heating tube when the guard 33 is manually forced toward the outermost end of said heating member, against the resistance of spring 35, until the grooves 34 clear the rivets 16. A slight movement at an angle to the direction of the grooves 34 may assist in releasing the movable member from the fixed or heating member.

I claim:

1. In a curling iron, a hollow tube, a heating element in said tube, a movable jaw, and a handle secured to said tube, and oppositely disposed rivets, said rivets providing bearings for said movable jaw.

2. In a curling iron, a hollow tube, a heating element in said tube, a movable jaw, a handle, and a ferrule about one end of said handle and secured to said tube by oppositely disposed rivets, said rivets providing bearings for said movable jaw.

3. A curling iron having a hollow member to receive a heating element, a heating element therefor, a handle for said hollow member, a movable jaw disposed thereon and having opposed grooves therein, and connecting means intermediate said hollow member and said handle comprising members with deformable ends adapted to be spread from within said hollow member to secure said handle thereon and provide an external support for said jaw, the grooved portions of said jaw being seated upon said members, the spreading of the ends of said connecting means providing in said hollow member an uninterrupted passage for the receipt therein of said heating element.

4. A curling iron as described in claim 3, and in which said connecting means comprises rivets adapted to be secured to the innermost surface of said hollow member by spreading of the material of the hollow end thereof.

5. In curling iron construction, a member to be heated, a handle therefor, a movable jaw, and rivets for securing said handle to the member to be heated and providing connecting means intermediate said movable jaw and the member to be heated, said jaw having opposed grooves coacting with said rivets to provide for the attachment and detachment of said jaw from said member to be heated.

6. As a new article of manufacture, a curling iron comprising a hollow tube, a handle therefor, a ferrule about said handle and tube, a movable shield, and oppositely disposed rivets passing through said ferrule, handle and tube and providing a pivoted mounting for said movable jaw.

7. In a curling iron, a heated member, a handle therefor, a movable jaw, and pin connections intermediate said heated member and said handle, the movable jaw having oppositely disposed grooves for engaging said pin members to pivotally secured said jaw upon said heated member.

8. A curling iron comprising a hollow tube, a heating element therefor, a handle, rivets extending through said handle and said tube, a movable jaw having grooves adapted to be seated upon the outer ends of said rivets, and a spring for urging said jaw closed.

LE ROY TRONC.